July 7, 1970  A. D. STRUBLE, JR  3,519,530
REINFORCED PLASTIC BALLOON MATERIAL LAMINATES
WITH CREPE EFFECT
Filed Dec. 11, 1964  2 Sheets-Sheet 1
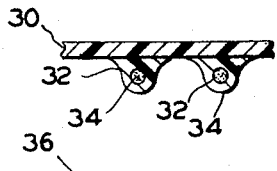
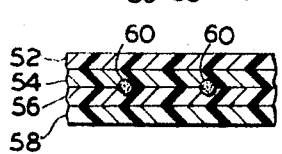
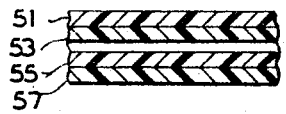
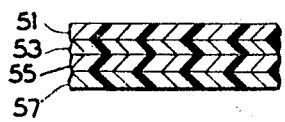
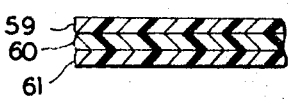
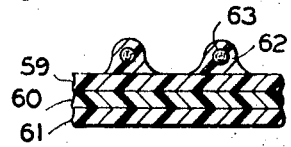
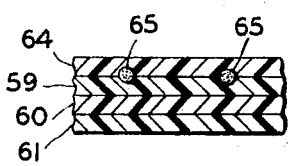
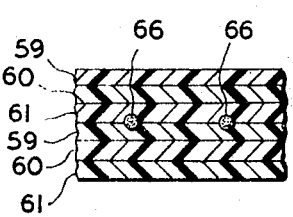
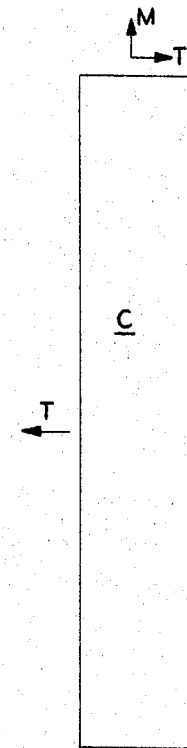
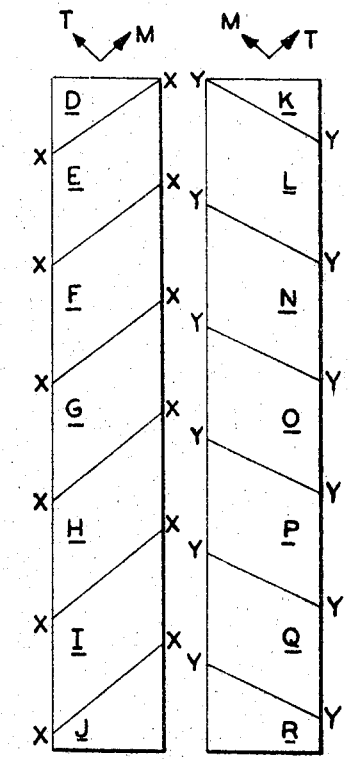
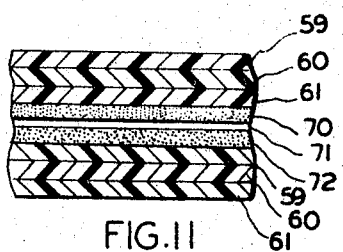
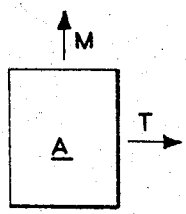
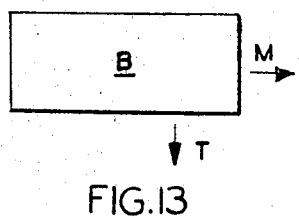
INVENTOR
ARTHUR D. STRUBLE, JR.
BY *Philpitt, Stininger & Priddy*
ATTORNEYS July 7, 1970  A. D. STRUBLE, JR  3,519,530
REINFORCED PLASTIC BALLOON MATERIAL LAMINATES
WITH CREPE EFFECT
Filed Dec. 11, 1964  2 Sheets-Sheet 2

INVENTOR
ARTHUR D. STRUBLE, JR.

BY *Philpitt, Steininger & Priddy*
ATTORNEYS

United States Patent Office 3,519,530
Patented July 7, 1970

3,519,530
REINFORCED PLASTIC BALLOON MATERIAL
LAMINATES WITH CREPE EFFECT
Arthur D. Struble, Jr., Torrance, Calif.
(2101 Rosita Place, Palos Verdes, Calif. 92266)
Filed Dec. 11, 1964, Ser. No. 417,555
Int. Cl. B32b 3/28, 7/02; B64b 1/58
U.S. Cl. 161—129
1 Claim

ABSTRACT OF THE DISCLOSURE

This invention generally relates to composite, flexible, laminated sheet materials wherein at least one sheet layer consists of a thermoplastic or thermosetting material, with or without strengthening filaments, metal foil layers, or plastic foam layers. The laminated sheets of this invention are particularly useful for balloon construction, but they also have other uses. More specifically, a filament reinforced plastic balloon material is provided having a crepe effect in the plastic layer. The crepe effect is produced by bonding the plastic material to the reinforcing filaments while the latter are in a stretched condition. The crepe effect prevents cracking of the plastic due to shrinkage at extremely low temperatures.

---

Figure 17:
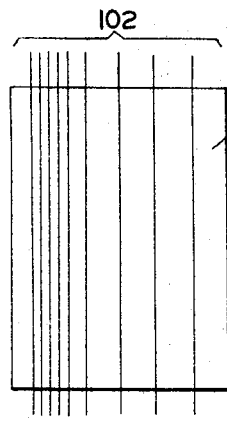

The invention will be best understood by reading the following description in conjunction with the drawings.

FIG. 1 shows a sheet of thermoplastic material 30, and attached to the underside of sheet 30 are a plurality of thermoplastic coated strength filaments 34. Strength filaments 34 are coated with a thermoplastic material 32 that is compatible with the sheet of plastic 30. Compatibility is necessary in order that the two thermoplastic materials 30 and 32 can be fused or heat sealed together Specifically if plastic sheet 30 is polyethylene, coating plastic 32 is also preferably polyethylene so that when the plastic-coated strength filament and the plastic sheet are pressed together, and heat applied, the plastic materials will melt and fuse together along their contacting interfaces.

FIG. 2 shows two thermoplastic sheets 36 and 38 which have been placed on each side of strength filaments 40, and the sheets then heated and pressed together so that the strength filaments are embedded therein.

FIG. 3 shows a multiplicity of thermoplastic sheets (42, 44, 46 and 48) that have had strength filaments 50 placed therebetween and then the sheets are heated and pressed together so that the strength filaments 50 become embedded therein. This operation can be carried out two sheets at a time or all at once.

FIG. 4 shows two thermoplastic sheets 54 and 56 that have been pressed together under the influence of heat to embed strength filaments 60 between them. Prior to or subsequent to this embedding operation the thermoplastic sheets 54 and 56 may be coated with an adhesive on their exterior sides and then laminated to sheets of non-thermoplastic material 52 and 58. Such non-thermoplastic material may comprise Mylar, or other similar plastic, or metal foil such as aluminum foil. Mylar is a polyethylene terephthalate resin. The resulting "sandwich" of sheets possesses the desirable characteristics of each of the components.

Examples of suitable thermoplastic materials in accordance with this invention may be mentioned: polyethylene, polypropylene, polyvinyl materials, such as polyvinyl acetates and polyvinyl chlorides, nylon, etc., and those skilled in the plastics art will readily recognize a number of other functionally equivalent materials.

The plastic layers of this invention are preferably within the range of 0.1 to 10 mils.

The strength filaments that are useful in accordance with this invention would include a variety of materials having at least some strength and which can be in thread or strand form. For example, suitable strength filaments would include threads or strands of nylon, fiber glass, Dacron, Fortisan, thin metallic wire, etc. Dacron is a synthetic fiber made by the condensation of dimethyl terephthalate and ethylene glycol. Fortisan is a high strength rayon. Diameters within the denier range of 10–1,000 are preferred, and especially preferred is a denier range of 40–100.

It is preferable that the strength filaments in accordance with this invention be rather loosely formed (rather than being twisted tightly in an axial direction) so that when they are embedded in or joined to plastic material, as for example by heat and pressure means, the plastic will penetrate between the individual fibers which compose each strength filament. Each fiber of the strength filament is in effect encased by a thermoplastic material, which makes a high-strength composite or laminate. Stated in other words, the individual fibers of the strength filaments are preferably splayed apart to a considerable extent, and it is not desired to have the individual fibers all twisted tightly together. This is particularly so with regard to fiber glass.

FIG. 5 shows four layers of plastic material, layers 51 and 57 being polypropylene and layers 53 and 55 being polyethylene. Composite 51 and 53 is formed by heating polypropylene to a temperature above the melting point of polyethylene but below the melting point of polypropylene. (Preferably the polypropylene is heated until it gets tacky.) When polyethylene film 53 is brought into contact with hot polypropylene sheet 51, the polyethylene sheet 53 will melt to at least a limited extent and in so doing will bond itself to sheet 51. Composite 55–57 can be formed in exactly the same way.

FIG. 6 then shows the composites 51–53 and 55–57 bonded together. Such bonding is accomplished by heating the polyethylene portions (53 and 55) of composites 51–53 and 55–57 and then pressing the composites together so that the two composites form a quadruple laminate which has some of the best properties of both the polyethylene and the polypropylene.

FIG. 7 shows a composite consisting of a sheet of polypropylene 60 between two layers of polyethylene (59 and 61). This composite was formed by heating the sheet of polypropylene (as was done in connection with FIG. 5) and then pressing the sheets of polyethylene against the hot polypropylene so that the polyethylene sheets will melt to at least a limited extent and bond themselves to opposite sides of the polypropylene sheet 60. In a similar fashion a central sheet of polyethylene could be bonded to two exterior sheets of polypropylene.

FIG. 8 shows the product of FIG. 7 which has been modified by the teachings of the product of FIG. 1. In other words, the product of FIG. 7 has been modified by thermally bonding to polyethylene sheet 59 strength filaments 63 that have been coated with a thermoplastic material 62.

FIG. 9 shows the product of FIG. 7 which has been modified by the teachings of FIG. 2. In other words, the product of FIG. 7 has been modified by placing upon the upper polyethylene sheet 59 some strength filaments 65 and thereafter covering the strength filaments with a further sheet of polyethylene 64. Strength filaments 65 are embedded between polyethylene sheets 59 and 64 by the application of heat and pressure.

FIG. 10 shows two triple-layered composites of the type shown in FIG. 7 which have been placed on both sides of strength filaments 66, and then the abutting thermoplastic (e.g., polyethylene) layers 59 and 61 bonded together by heat and pressure, thus embedding the strength filaments.

FIG. 11 shows two three-layer composites (59–60–61) of the type shown in FIG. 7 which have sandwiched between them a sheet 71 of either (a) a thermosetting material or (b) a metal foil. Adhesive 70 on the upper surface of the sheet 71 and adhesive 72 on the lower surface of sheet 71 make a firm bond between the sheet 71 and the adjacent thermoplastic layers. In the arrangement shown in FIG. 11, strength filaments could be incorporated exteriorly (as taught by FIG. 1) or interiorly (as taught by FIGS. 2–4, 9 and 10).

FIGS. 12 and 13 show two strips of plastic material, A and B. Each strip of plastic is considered to have strengths in two directions, namely, strength in the machine direction (M) and strength in the transverse direction (T). These strength directions are indicated by the arrows M and T in FIGS. 12 and 13. The machine direction is the direction that the sheets come out of the machine and the strength in this direction is usually greater than the strength in the transverse direction. In accordance with this invention where a multiple construction is used (e.g., FIGS. 2–11), I sometimes find it advantageous to arrange the plurality of layers of plastic material so that the M strength of one layer will not be aligned with the M strength of another layer. For example, if only two layers of plastic material are to be used, the sheets might preferably be aligned so that the M strengths are at approximately right angles to each other. If three layers are used then the M strengths could be at approximately 120 degrees with respect to each other. Arrangements of this sort can be rather easily achieved by cutting long strips of plastic material into small squares and then resealing the squares together along the edges that were not cut. Alternatively a long strip of plastic can be cut into many small parallelograms and the small parallelograms sealed together along their uncut edges.

The above alternatives are illustrated by FIGS. 14–16. FIG. 14 shows a single plastic sheet C having the M and T strengths in the directions indicated by the arrows. FIG. 15 is a sheet consisting of seven smaller pieces of plastic (D, E, F, G, H, I and J) and each of these pieces have M and T strengths in the directions indicated by the arrows. When these seven pieces are sealed together along diagonal lines X—X, a single long sheet can be produced and the entire sheet would have the M and T strengths aligned in the directions indicated by the arrows. FIG. 16 is similar to FIG. 15 in that it consists of seven separate pieces (K, L, N, O, P, Q, R) that have been heat sealed together along the diagonal lines Y—Y. Since each of the pieces has M and T strengths in the directions indicated by the arrows, the entire sheet will also have M and T strengths in the directions indicated by the arrows.

The three long sheets shown in FIGS. 14–16 may be laminated together by superimposing them upon each other and feeding the composite through heated rollers under pressure.

By appropriately arranging a plurality of strips of plastic with their M strengths at different angles with respect to each other, desirable characteristics for a particular application can be achieved. Furthermore, such arranging not only modifies the overall strength characteristics of the composite or laminate formed therefrom, but it also modifies extensibility, cold brittleness, tearing, crease resistance and other characteristics. One can thereby obtain a "balanced" film or even an "unbalanced" one if this was deemed more desirable for a particular purpose.

When one has decided upon the number of layers of plastic that are to be used in a laminate, and once each layer has been positioned in relation to the other layers (insofar as M strengths are concerned), there only remains the matter of bonding the layers to each other. This can be most easily carried out by passing the plurality of layers through heated rollers, the rollers being urged toward each other by pressure which can be varied depending upon the number of layers to be laminated. Strength filaments can either be placed between the layers and bonded at the same time, or the strength filaments can be attached to the layers before the layers are laminated.

FIG. 17 illustrates how the strength of a sheet of plastic 100 may be varied from one area to another by the selective placement of strength filaments 102 at non-uniform spacings across the face of the sheet 100. In FIG. 17 then, the strength of the left side of sheet 100 will be greater than the right side because there are more strengthening filaments on the left side.

Figure 18:
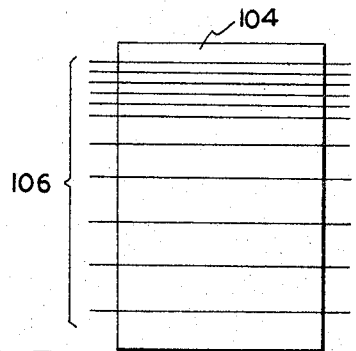

FIG. 18 illustrates another sheet of plastic 104 having strength members 106 bonded thereto. The strength of the top of the sheet 104 will be greater than the bottom because there are more strength members near the top.

If the strengthened sheets of FIGS. 17 and 18 are laminated together, the upper left-hand corner of the laminate will be strongest and the lower right-hand corner the weakest.

The strength of a film or a laminate can also be varied across a given area by (a) varying the size of the strengthening filaments or (b) by using strength filaments composed of different materials (having different strengths) across the face of the sheet.

Figure 19:
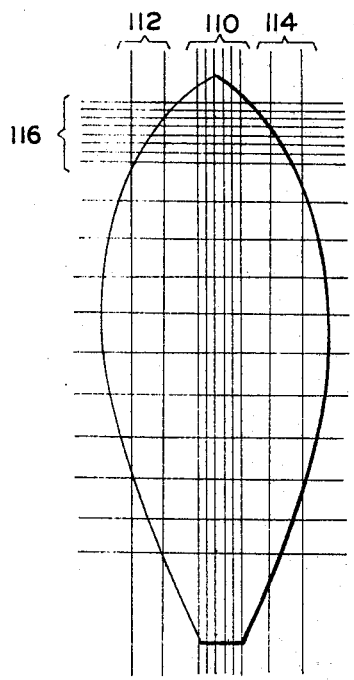

FIG. 19 illustrates a balloon gore made of a plastic sheet or plastic laminate that has been strengthened more in certain areas than others with strength filaments. As shown, a group of strong, closely spaced filaments 110 pass vertically through the gore, with wider spaced groups of filaments 112 and 114 on either side thereof. Horizontally closely spaced strength filaments 116 are at the top of the gore and less closely spaced horizontal strength filaments are disposed therebelow.

A preferred balloon gore in accordance with this invention can be constructed by embedding the strength filaments adjacent the curved edges of the gore. If a balloon is formed from a plurality of such gores, then when the adjacent curved sides of gores are joined together (and the curved edges have embedded strength members) a very strong balloon results.

Figure 20:
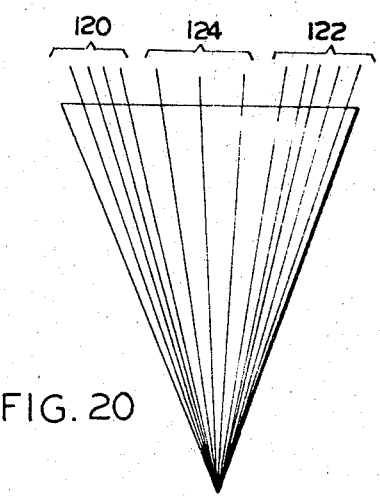

FIG. 20 illustrates a triangular expanse of plastic sheet or plastic laminate wherein the strength members both (a) diverge outwardly in a non-parallel fashion and (b) are grouped more closely together at the two sides 120 and 122 than at the center 124. The thickness of the filaments can also be varied from area to area.

Figure 21:
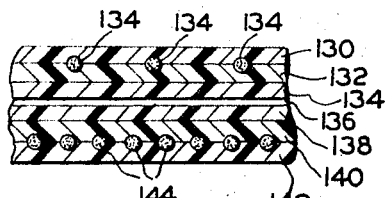

FIG. 21 is a laminate which illustrates another way in which strength members may be distributed therethrough. Filaments 134 which are embedded between plastic layers 132 and 132 are spaced fairly far apart. Filament 136 is embedded between layers 134 and 138 and is disposed at right angles to the disposition of filaments 134. Strength filaments 144 are embedded between layers 140 and 142 and are spaced much closer together than filaments 134.

Figure 22:
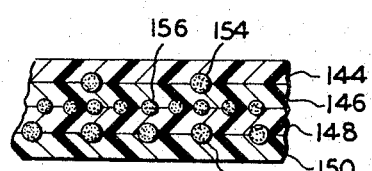

FIG. 22 shows a laminate consisting of four plastic layers 144, 146, 148 and 150 wherein strength filaments are embedded between adjacent layers. Filaments 154 and large and widely spaced; filaments 152 are somewhat smaller in size and more closely spaced; and filaments 156 are much smaller and much more closely spaced.

Figure 24:
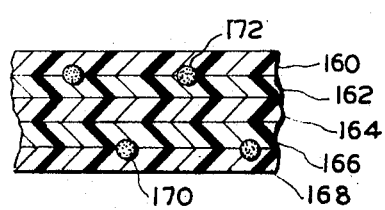

The laminates in accordance with this invention may also include a layer of plastic foam. For example, in FIG. 24 plastic layers 160 and 162 are shown, with strength members 172 embedded therebetween. Likewise plastic layers 166 and 168 have embedded therein strength filaments 170. Between plastic layers 166 and 162 there is a layer of plastic foam 164 (such as polyethylene foam or Styrofoam). The plastic foam can be either thermoplastic or thermosetting. If it is a thermosetting foam, adhesive will be necessary in order to produce a laminate. The foam could be replaced with other filler materials for certain uses.

Figure 23:
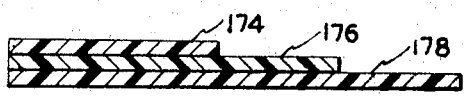

FIG. 23 illustrates a further variation of this invention wherein a plastic laminate is made thicker in certain areas than others. This principle is of use in balloon making because it is often desirable for certain sections to be thicker and stronger than other sections. With thin layers, the seam line between the heat laminated layers is not readily visible. Balloons that are several hundred feet long have quite different pressure requirements at the bottom of the balloon as compared to the top. Also, for control purposes it may be desirable to have limited areas of the balloon much stronger or stiffer than other sections.

A plastic film of varying thickness along its length can also be produced by extruding the plastic and varying the area of the extrusion opening either continuously or periodically during the course of the extrusion.

Figure 25:
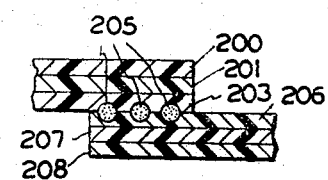

FIG. 25 shows an upper laminate and a lower laminate that overlap and which have been bonded together adjacent their edges to form a sort of seam, and the seam is strengthened by the inclusion of strength filaments. Specifically by way of example, the upper laminate consists of polyethylene layers 200 and 203 bonded to an intermediate propylene layer 201 and the lower laminate consists of polyethylene layers 206 and 208 which surround intermediate layer 207. Strength filaments 205 are positioned between the edge portions of the overlapping upper and lower laminates, and then these laminates are bonded together so that the strength filaments reinforce the seam. This principle can be particularly useful for balloon gores (in either curved or straight joints). This concept can be used either in the center or the edges of gores (or both) and can decrease or eliminate the need for conventional tapes.

As a further variation in accordance with this invention (referring to FIG. 4) layers 52 and 58 could be polyethylene and layers 54 and 56 could be Mylar, with the strength filaments positioned between the layers of Mylar. Alternatively, (again referring to FIG. 4) layers 52 and 58 could be Mylar and layers 54 and 56 could be polyethylene. Also 52 and 56 could be Mylar and 54 and 58 could be polyethylene.

Another useful lamination in accordance with my invention comprises layers of polyethylene, Mylar, strengthening filaments and polyethylene—in that order.

The various plastic films and plastic laminates described above have great utility and possess many novel and worthwhile properties. They are particularly useful for balloon making, but they also have many other uses.

Figure 26:
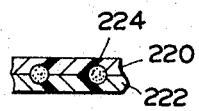

FIG. 26 shows another laminate in accordance with this invention which consists of a layer of Mylar 220, a layer of polyethylene or polypropylene 222, and some strength filaments 224 disposed between layers 220 and 222. Such a lamination may be made with the aid of an appropriate adhesive between the layers of plastic 220 and 222. Alternatively, layers 220 and 222 could be bonded together by heat or pressure or both.

Figure 27:
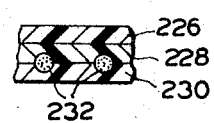

FIG. 27 shows still another laminate in accordance with my invention which consists of a first layer of Mylar 226, a second layer of polyethylene or polypropylene 228, and a third layer 230 consisting of polyethylene or polypropylene, and strength filaments 232 disposed between layers 228 and 230. Adhesives or heat or pressure or a combination thereof may be utilized to bond the various layers to each other and around the filaments.

The layers described above (in FIGS. 26 and 27) are preferably within the range of 0.1 to 10.0 mils. The strength filaments may be twisted or untwisted and of the type set forth in the eighth paragraph of this specification.

In accordance with another embodiment of my invention, I can produce a balloon fabric material which will be able to rise from the relatively warm temperatures prevailing at ground level to the very cold temperatures prevailing at high altitudes. Balloon fabrics that are made by simply bonding a plurality of strength members to one or more layers of plastic suffer from the drawback that at the very low temperatures which prevail at high altitudes the platic films (particularly polyethylene film) will sometimes shrink at a greater rate than will the strength members that are made of nylon, Dacron, fiber glass, etc. This can result in a stretching and cracking of the plastic film, with resultant loss of gas and failure of the balloon.

I have found that this problem can be overcome by stretching the strength filaments prior to the time that they are interposed between two layers of plastic material. Stretching of a number of filaments at the same time can be accomplished in any suitable type of pulling device or stretching arrangement, as will be apparent to those skilled in the art. The filaments are maintained under stretching tension (e.g., stretching to between 102 and 120 percent of their normal length) until one or more plastic films or layers have been securely bonded thereto. The filaments are thereafter released from tension, and in resuming their normal length they in effect impart at least a slight crinkled or "crepe" effect to the plastic sheet (or sheets) to which the filaments are attached. A balloon envelope made of such material will retain this slight crinkled or crepe effect at low altitudes but as the balloon rises to high altitudes and encounters very cold conditions, the plastic film will shrink. However, since the balloon in effect has some excess of plastic film "built in" due to the crepe effect, shrinkage will not result in a stressing or cracking of the film or failure of the balloon.

The amount of stretch applied to the stretch filaments will depend upon the extent of "creping" desired and different materials will require different pulls in order to ultimately achieve the same "creping-effect."

Plastic material produced as above may of course be bonded to a sheet of "uncreped" plastic, with the result that at least one layer of the laminate will be creped and at least one layer will be uncreped.

I have, in the drawings and specification, presented a detailed disclosure of some preferred embodiments of my invention. It is to be understood that the invention is susceptible to many modifications, structural changes and various applications of use within the spirit and scope of the invention and I do not intend to limit the invention to the specific form disclosed but intend to cover all modifications, changes, alternative constructions and methods falling within the scope of the principles taught by my invention.

What is claimed is:

1. In a balloon envelope material for use in high altitude balloons comprising at least one layer of thin plastic material bonded to a plurality of strength filaments wherein the plastic material has an inherent rate of shrinkage greater than that of the strength filaments at the low temperatures prevailing at high altitudes, the improvement comprising said strength filaments being bonded to said plastic material while the filaments are stretched to at least 102% of their normal length whereby said plastic material has a crepe effect over its surface when said strength filaments are untensioned and the balloon material is at relatively warm temperatures, and said crepe effect having a tendency to disappear due to shrinkage of the plastic material when the balloon material is at the low temperatures prevailing at high altitudes.

References Cited

UNITED STATES PATENTS

| | | | |
|---|---|---|---|
| 2,059,792 | 11/1936 | Hill | 156—93 |
| 3,445,319 | 5/1969 | Dawbarn | 161—58 |
| 1,081,794 | 12/1913 | Vaniman | 244—133 X |
| 1,442,323 | 1/1923 | Brush | 244—133.5 |
| 2,756,948 | 7/1956 | Winzen et al. | 244—31 |
| 2,905,581 | 9/1959 | Maxey | 156—183 X |
| 3,041,013 | 6/1962 | Froehlich | 244—31 |
| 3,182,932 | 5/1965 | Winker | 244—31 |
| 3,311,328 | 3/1967 | Slater | 244—31 |
| 3,391,883 | 7/1968 | Curtis | 244—31 |
| 1,316,456 | 9/1919 | McKechinie. | |
| 2,067,025 | 1/1937 | Schmidt. | |
| 2,522,527 | 9/1950 | Manning. | |
| 2,545,981 | 3/1951 | Warp | 161—123 XR |
| 2,767,940 | 10/1956 | Melton. | |
| 2,830,923 | 4/1958 | Kizzek. | |
| 2,851,389 | 9/1958 | Lappala. | |
| 2,858,090 | 10/1958 | Winzen et al. | |
| 2,998,501 | 8/1961 | Edberg et al. | 219—10.65 |
| 3,149,017 | 9/1964 | Ehrreich et al. | |
| 3,188,265 | 6/1965 | Charbonneau | 161—188 |
| 3,220,004 | 11/1965 | Gillespie | 343—18 |
| 3,238,077 | 3/1966 | Clark et al. | 156—60 |
| 3,322,613 | 5/1967 | Rasmussen | 161—234 |

OTHER REFERENCES

Booda, L.: "USAF Balloon Achieves Endurance Mark," Aviation Week and Space Technology, July 16, 1962.

ROBERT F. BURNETT, Primary Examiner

W. W. SCHWARZE, Assistant Examiner

U.S. Cl. X.R.

156—161, 183, 264; 161—57, 116, 143, 166, 402; 244—31